(12) United States Patent
Roch

(10) Patent No.: US 12,280,611 B2
(45) Date of Patent: Apr. 22, 2025

(54) DEVICE FOR PROCESSING DOCUMENTS

(71) Applicant: MB AUTOMATION GmbH & Co. KG, Roding (DE)

(72) Inventor: Julia Roch, Neukirchen/Erzgebirge (DE)

(73) Assignee: MB AUTOMATION GmbH & Co. KG, Roding (DE)

( * ) Notice: Subject to any disclaimer, the term of this patent is extended or adjusted under 35 U.S.C. 154(b) by 0 days.

(21) Appl. No.: 18/199,023

(22) Filed: May 18, 2023

(65) Prior Publication Data

US 2024/0217259 A1    Jul. 4, 2024

(30) Foreign Application Priority Data

May 19, 2022  (DE) ...................... 10 2022 112 628.5
May 19, 2022  (DE) ...................... 10 2022 112 629.3

(51) Int. Cl.
  *B42D 25/41*  (2014.01)
  *B41J 2/44*   (2006.01)
  *B41M 3/14*   (2006.01)

(52) U.S. Cl.
  CPC .............. *B42D 25/41* (2014.10); *B41J 2/442* (2013.01); *B41M 3/148* (2013.01)

(58) Field of Classification Search
  CPC ......... B41M 3/148; B41M 3/14; B42D 25/41; B23K 26/0643; B41J 2/442; B41J 2/44
  USPC ....... 283/67, 70, 72, 85, 86, 91, 94, 98, 117, 283/901
  See application file for complete search history.

(56) References Cited

U.S. PATENT DOCUMENTS

| | | | |
|---|---|---|---|
| 2005/0098549 A1* | 5/2005 | Ito .................... | B23K 26/0853 219/121.78 |
| 2017/0106672 A1 | 4/2017 | Klages et al. | |
| 2019/0315150 A1* | 10/2019 | Rauch ................ | B42D 25/435 |

FOREIGN PATENT DOCUMENTS

| | | |
|---|---|---|
| DE | 102005054396 A1 | 6/2006 |
| DE | 102006031024 A1 | 1/2008 |
| DE | 202008007564 U1 | 8/2008 |
| DE | 102006052380 B4 | 4/2013 |
| DE | 202021001324 U1 | 5/2021 |
| EP | 0216947 A1 | 4/1987 |
| EP | 0219012 A2 | 4/1987 |
| EP | 2050574 A1 | 4/2009 |
| EP | 3424731 A1 | 1/2019 |
| FR | 2898528 A1 | 9/2007 |

\* cited by examiner

*Primary Examiner* — Justin V Lewis
(74) *Attorney, Agent, or Firm* — Dykema Gossett PLLC

(57) ABSTRACT

The present invention relates to a device for processing documents (document processing system), in particular security documents. The document processing system according to the invention comprises at least one document carrier device with a document receptacle configured to receive and transport a document to be processed, and a document processing device configured to process the document in a specific processing area, wherein the document carrier device is configured to move the document in two spatial directions.

10 Claims, 9 Drawing Sheets

Fig. 2a
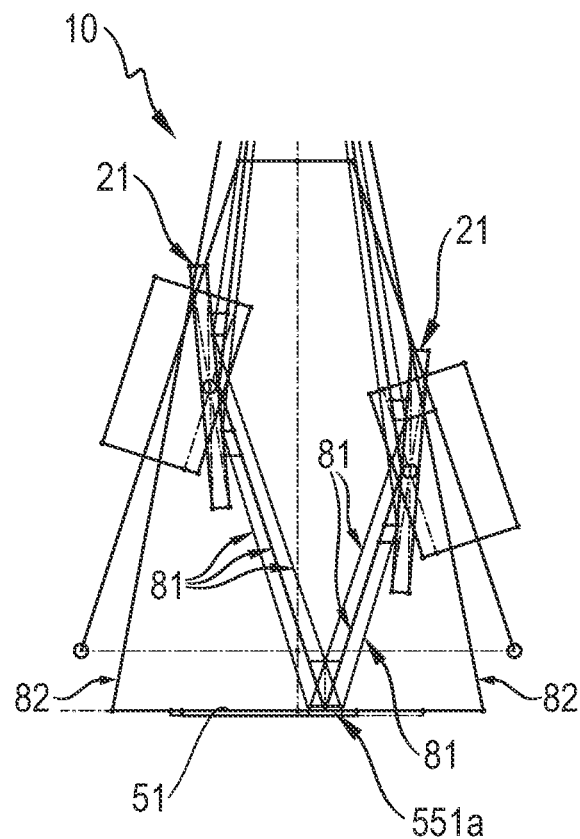
Fig. 3a
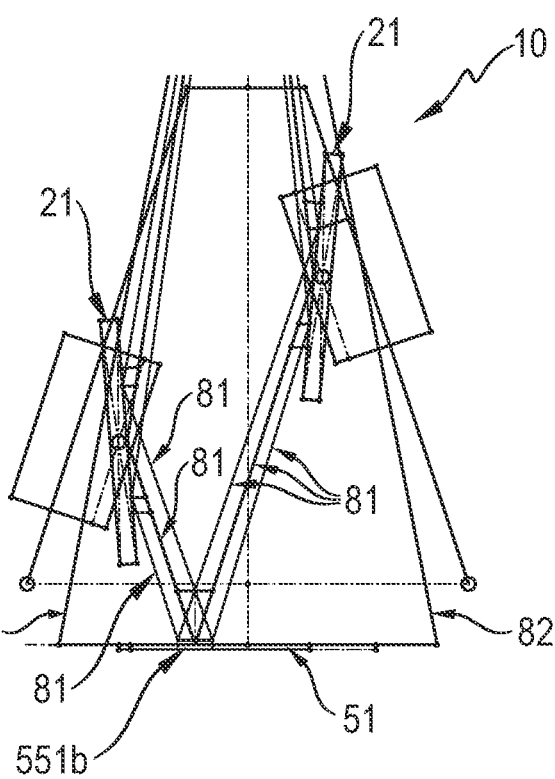
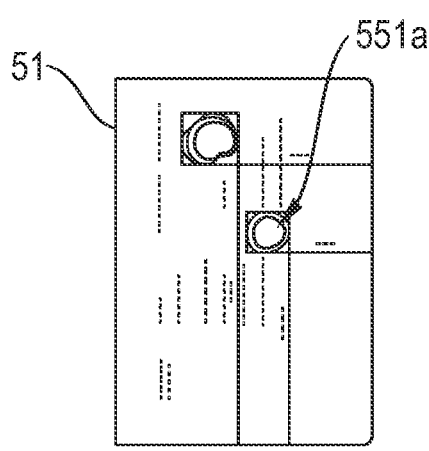
Fig. 2b
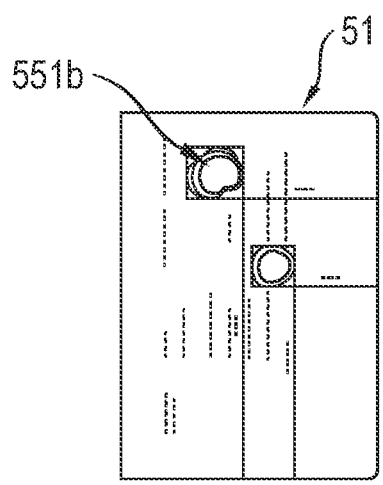
Fig. 3b

DEVICE FOR PROCESSING DOCUMENTS

CROSS-REFERENCE TO RELATED APPLICATION

This application claims the benefit of priority to Germany application No. 10 2022 112 628.5, filed 19 May 2022. This application claims the benefit of priority to Germany application No. 10 2022 112 629.3, filed 19 May 2022.

BRIEF SUMMARY

The invention relates to a device for processing documents (document processing system), in particular security documents. The document processing system is provided in particular for the personalization of documents. The documents to be processed can in particular be card-like or book-like documents and in particular security documents, such as identification documents or credit cards, bank cards, membership cards and the like.

BACKGROUND

A multiplicity of different types of personalized documents, in particular in card form or book form, are known from the prior art. For example, book-like passport documents or individual pages thereof (e.g., the so-called "passport holder page" or paper pages), identification cards and many types of personalized chip cards, such as bank cards, credit cards, identification cards, membership cards, access authorization cards, etc., or personalized (usually card-shaped) labels each belong to the group of personalized documents.

In this context, "personalization" or "personalized" means that the corresponding document contains or carries document-specific information that is typically associated with a holder of the document. For example, in some cases, the information can identify the holder, for example, by means of the holder's name, passport photograph, identity number or other features printed on, otherwise applied onto or introduced into the document or stored therein, in particular in the form of data. In particular, the personalization can be related to an individual person or even to a specific limited group of persons, for example employees of a company.

The processing of the documents to provide them with document-specific and/or non-document-specific information can be carried out in particular by means of printing, by means of engraving or, in particular in the case of a plastic surface, by means of targeted local discoloration of the surface material of the document, in particular in gray shades or gradations thereof, by the action of energy, in particular by means of a suitable laser.

The unexamined German application DE 10 2006 031 024 A1 describes a document processing system and a method for printing security documents. The document processing system comprises a printing unit for printing a security document located in a printing area and a feed unit for successively feeding the security documents into the printing area. The feed unit has a plurality of movable document carriers (document carrier device) for receiving a security document to be printed and moving it into and out of the printing area. The device also has a drive unit for moving the document carriers along a feed direction on various planes arranged perpendicular to the feed direction. Furthermore, it comprises a control unit for controlling the drive device so that the plurality of document carriers are each moved alternately between a receiving position, in which a security document is received, and the printing area. This is done in such a manner that the drive device moves the plurality of carrier devices past each other on the different planes as they move in the feed direction.

In order to increase the counterfeit protection of security documents, security features are incorporated into the document. A widely used security feature is implemented by a so-called "tilt image", also known by the abbreviations "MLI" or "CLI" for "Laser Image". A tilt image that is visible when the document is tilted about the horizontal axis is referred to as MLI, while a tilt image that is visible when the document is tilted about the vertical axis rotated by 90° is referred to as CLI.

Such a tilt image usually has a lens structure along its lateral extent as an optically effective imaging structure and is implemented with an information structure deposited in the lens structure. Thus, the introduced information only becomes visible when light rays are refracted through the lens structure at the correct angle. Depending on the viewing direction, an image is therefore visible or not visible, or only visible in a strongly attenuated form. Such tilt images are applied, for example, as security features on plastic cards and identification documents. The advantage is due to the relatively simple visual verifiability of the tilt images, which is possible even under simple lighting conditions. Such a tilt image is disclosed, for example, in patent specification EP 0 219 012 A2. In order to increase counterfeit protection, relief lenses can also be provided, as disclosed, for example, in patent specification EP 0 216 947 A1.

To produce such tilt images, lasers are used in a document processing system, which can be directed to the document via mirror arrangements in order to apply the tilt image onto the security document. In the case that multiple tilt images are to be applied onto the document at different positions, or that both an MLI tilt image and a CLI tilt image are to be applied onto the document, the document has first to be removed from the document processing system and the corresponding mirror arrangement must be converted (position, and/or orientation change) in order to be able to proceed with the processing. Often, a test run of the converted arrangement is also necessary to ensure functional capability. The entire process is therefore time-consuming and cost-intensive.

SUMMARY OF THE INVENTION

It is therefore the object of the present invention to provide a document processing system which ensures improved handling when processing documents, in particular when inserting security features in the form of tilt images. Furthermore, it is the object of the present invention to provide a method for processing a document by means of the document processing system according to the invention.

This object is achieved by the subject matters of the independent claims. Advantageous refinements of the invention are disclosed in the sub-claims.

An embodiment according to the invention of a document processing system for processing documents, in particular security documents, comprises at least one document carrier device with a document receptacle, wherein the document carrier device is designed to receive and transport a document to be processed. Within the context of this application, "receiving a document" is to be understood as meaning that the document can be inserted into the document receptacle and, in particular, fixed by the latter. In this case, the document receptacle can be provided in particular as a recess in a surface with the dimensions of the recess corresponding exactly to the dimensions of the document to be received. Such a recess also fixes the document against horizontal displacement on the document carrier device. Other possibilities of positive fixing or, for example, by negative pressure or by the pressure of a mask placed onto the document from above which presses the document into the document receptacle, are also conceivable.

The document carrier device is adapted to be moved in particular by an actuator in the document processing system and thus to transport the document.

Furthermore, the document processing system has a document processing device which is designed to process the document in a specific processing area. Within the context of the application, the processing of a document is to be understood as the insertion of a visible element comprising personalized document-related data such as name, date of birth or passport photo and/or visible security features such as, in particular, tilt images. In this case, the data to be applied can itself also be provided as a security feature.

The document carrier device is designed to move or transport the document in two spatial directions. Two spatial directions are understood to be two non-parallel directions that span a plane. Particular preferred are two spatial directions located in the horizontal plane. By moving in two spatial directions in the horizontal plane, the document can thus be moved by the document carrier device to any point in the processing area. Thus, a visible element can be applied at any position of the document. Likewise, it is also possible to insert multiple visible elements at different positions of the document without changing the arrangement of the document processing device, in particular of any mirror arrangements that may be provided.

In a preferred embodiment of the invention, the document processing system has at least one radiation source, in particular a laser, which is provided for applying a security feature in the form of a tilt image onto the document.

In another advantageous embodiment of the document processing system according to the invention having a radiation source, the latter emits laser beams into a quadrangular, in particular rectangular, trapezoidal, diamond-shaped or square processing area. The processing area is defined here by the surface that can be reached by the laser beams of the radiation source. In this case, the document to be processed also has a quadrangular, in particular rectangular, square, parallelogram shape, with the processing area being rotated relative to the document by a defined angle, in particular 45 degrees. Due to the rotation, maximum utilization of the processing area on the document can be achieved, in particular in conjunction with the use of mirror arrangements through which the laser beams are reflected onto the document.

Advantageously, at least one first mirror arrangement is provided, which is designed to direct the radiation emitted by the radiation source onto the document in each case at a first defined angle and/or from a first defined direction. As described above, a tilt image such as a CLI or MLI element is a widely used security feature that can be easily checked visually. By means of the document processing system of the above-described embodiment, a tilt image can be provided at various positions on the document without the need for costly converting or changing the alignment of the mirror arrangement.

In another advantageous embodiment, the document processing system further comprises a second mirror arrangement which is also designed to direct the radiation emitted by the radiation source onto the document at a second defined angle and/or from a second defined direction, respectively. In doing so, the second defined direction of the second mirror arrangement is arranged offset by 90 degrees to the first direction of the first mirror arrangement. Due to the offset arrangement, the second mirror arrangement thus also applies the radiation of the radiation source onto the document offset by 90 degrees. Thus, MLI tilt images can be applied onto the surface of a document with the one mirror arrangement and CLI tilt images can be applied onto the surface of a document with the other mirror arrangement. Thus, by providing both mirror arrangements, both types of tilt images can be produced in a document processing system without the need to convert the system and remove the document to be processed from the system.

In another advantageous embodiment of the invention, the first and/or second mirror arrangements are designed to be modified during operation of the document processing system such that the position at which the radiation impinges on the document can be changed. Modification in operation is understood to mean that the document can remain on the document carrier device and that the document carrier device does not have to be moved in order to carry out the modification. This modification enables fine adjustment for applying the visible element, whereby quality can be improved further.

Furthermore, advantageous is an embodiment of the document processing system comprising an adjustment device designed to change the position and alignment of the at least one first mirror arrangement and/or the at least one second mirror arrangement such that the corresponding defined angle at which the radiation emitted by the radiation source impinges on the document is changed without changing the position of impingement of the radiation on the document. In such an embodiment, the change of the position of the impingement of the radiation on the document is performed purely via the document carrier device, which changes the position of the document. By means of the adjusting device, the angle of incidence of the radiation on the document can be adjusted and the document processing system can thus be adjusted to different requirements of the document to be processed, which are based, for example, on the choice of material or customer requirements. In addition, converting to different products is simplified by adjusting the mirror arrangements. Furthermore, such an embodiment can prevent the need to adapt the software to generate a tilt image since there is a symmetrical structure of a mirror arrangement consisting of two mirrors facing each other for generating the tilt image.

Particular preferred is such an embodiment if the adjusting device has receptacles, in particular in the form of openings, which are designed to receive corresponding counter elements arranged on the at least one first mirror arrangement and/or at least one second mirror arrangement (22) for securing the corresponding mirror arrangement. By such an embodiment, a possibility of the adjusting device can be provided which is easy to operate and minimizes the risk of incorrect operation. Moreover, it is technically easy to implement.

In another advantageous embodiment of the invention, the document carrier device is arranged on a cross table which is designed to move the document carrier device in two spatial directions which are in particular perpendicular to one another, wherein the movement of the cross table is carried out in particular by linear motors. Such cross tables are known in particular from the field of milling machines or drilling machines or also from microscopes. In this case, two guides are usually arranged perpendicular to one another, the table being arranged on the first guide so as to be movable in a first spatial direction and the first guide being arranged on a second guide perpendicular to the first guide, the first guide being movable in the second guide along the second spatial direction. Thus, an object placed on the table can be moved in the plane (usually horizontal plane) spanned by the two spatial directions.

The method according to the invention of processing a document by means of the described embodiment of the document processing system according to the invention initially comprises the processing step of moving the document carrier device to a receiving position. In this position, a document to be processed is placed on the document receptacle of the document carrier device. Subsequently, the document carrier device is moved along a first spatial direction and along a second spatial direction until the document is located at a first processing position within a processing area of the document processing system. At this position, processing of the document takes place. The first spatial direction and the second spatial direction are not identical. Finally, the document carrier device is moved to an output position in which the document is removed from the document receptacle. The output position can correspond to the receiving position.

In another method step, after processing in the first position, the document carrier device is moved to a further position in which the document is also processed. Thus, different processing operations can be carried out on different positions of the document without the need to remove the document from the document processing system or to change the arrangement.

In an advantageous embodiment of the invention, the document carrier device comprises a heating device designed to dissipate heat to the document received by the document carrier device.

By introducing heat, for example, drying processes can be accelerated, or better controlled, whereby both the processing speed and the processing quality of the document processing device can be improved.

Particular preferred is such an embodiment if the heating device comprises an actuator which is adapted to cause a relative movement between a heated heat conducting element and the document receptacle. By means of the relative movement it is possible to switch between two operating modes, wherein in a first operating mode, the heat conducting element extends through one or more recesses in the document receptacle to transfer heat generated by the heating device to the document at least in sections. In the second operating mode, the heating element has a greater distance from the document compared to the first operating mode so that no or only an insignificant amount of heat is transferred to the document.

In this manner, the heating element can remain permanently heated and can be set to the first operating mode for processing steps in which heating is required, and can switch to the second operating mode for processing steps in which heating is not required. As a result, heating and cooling phases can be skipped and the processing of the documents can be accelerated.

BRIEF DESCRIPTION OF THE DRAWINGS

In the following, embodiments and advantageous aspects of the present invention will be explained in more detail with reference to the accompanying figures. In the figures:

FIG. 2a shows a schematic illustration of a detail of a prior art document processing system 10 in a first configuration.

FIG. 2b shows a schematic illustration of a document 51 having a first visible element 551a.

FIG. 3a shows a schematic illustration of a detail of a prior art document processing system 10 in a second configuration.

FIG. 3b shows a schematic illustration of a document 51 having a second visible element 551b.

FIG. 5b shows the processing area 82 of the second embodiment shown in FIG. 5a.

FIG. 5e shows another illustration of a side view of the second embodiment of the invention shown in FIG. 5a.

DETAILED DESCRIPTION

Figure 1:
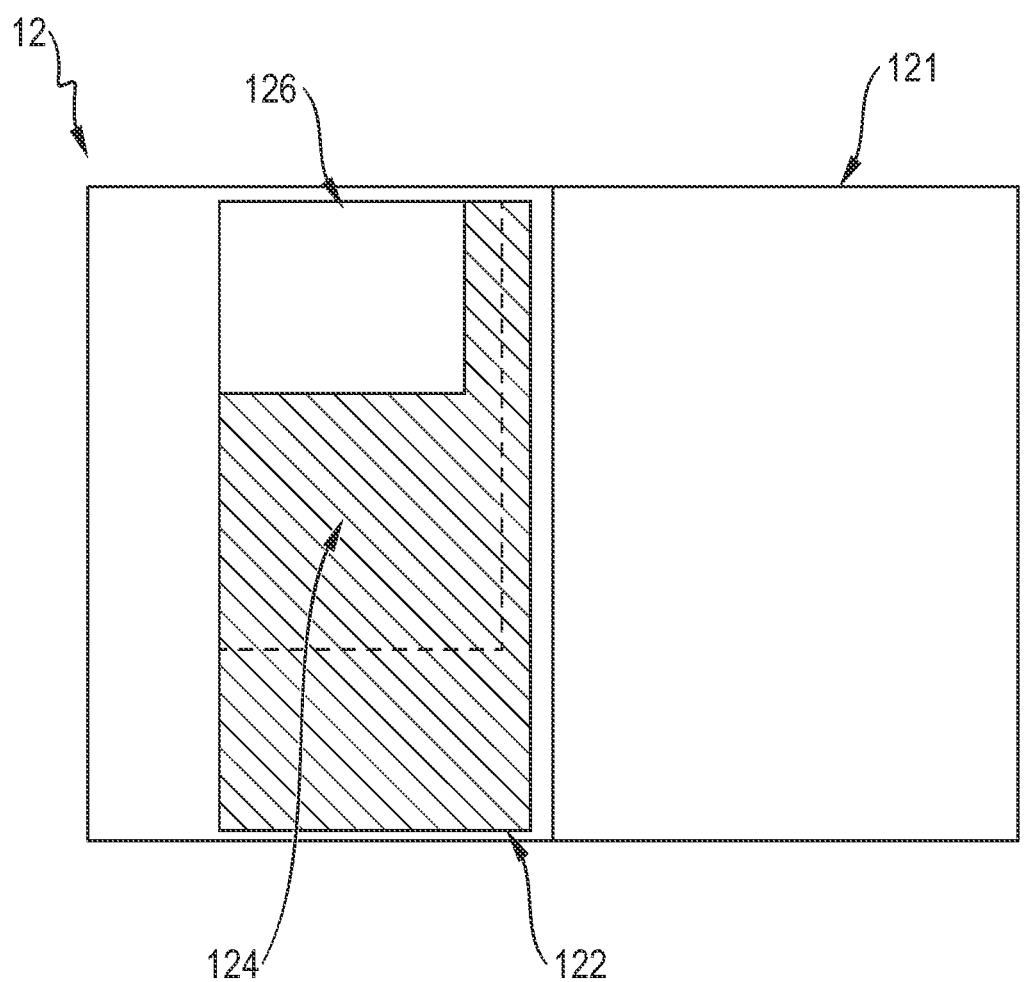
FIG. 1 shows a schematic illustration of a document carrier device 12 from above.

FIG. 1 shows a schematic illustration of a document carrier device 12 of a document processing system 10 (not shown in FIG. 1) from above. It has a document receptacle 121 which is provided in particular in the form of a recess in the document carrier device 12. A document 51 (not shown in FIG. 1) to be processed is to be placed in these defined areas for processing in a document processing system 10 (see FIGS. 4a to 5b). The document receptacle 121 is to be understood as the entire large rectangle in the figure. In the document receptacle 121 in turn, on the left side in the drawing plane is a processing face 122, which is shown as a shaded area. In this area, the processing in a document processing system 10 inserts a visible element into the document 51 to be processed.

The document receptacle 121 is designed in the present case such that a book-shaped document 51, such as a passport, can be received by it. It can also have a gap in the center into which the spine of a book-like document 51 can be received. A card position 124 is indicated on the left side of the document receptacle 121. This card position 124 can be provided, for example, by a further recess in the document receptacle 121. It has the standardized format of common credit cards, identification cards, membership cards and the like. By means of the corresponding recesses provided, the card or the book-shaped document can be fixed on the document receptacle 121, at least in the lateral direction, and can thus be secured against slipping.

Depending on the document to be processed, it is inserted either into the card position 124 or the document receptacle 121, wherein the processing can be carried out only in the processing face 122.

In an advantageous embodiment, a book-shaped document is placed on the document receptacle 121 and pressed from above onto the document receptacle 121 by a mask (not shown) which has a recess for the processing face 122 of the document, until the mask engages in a specific position, thus fixing the document flat on the document receptacle 121.

Both sides of the document receptacle 121 are independently spring-loaded. Depending on the number of pages of the book-shaped document, one side of the document receptacle 121 is possibly more heavily loaded by the application of the mask, but this can be compensated for by the independent mounting of the two sides, so that the surface of the document lies flat at a defined height for processing.

In order to clamp a card-shaped document in the document carrier device, a card adapter is required. The latter has the outer dimensions of the book-shaped document and is also clamped onto the document receptacle 121. The card-shaped document is then inserted into this adapter. Slight errors when inserting the documents are compensated for by software. In the course of this, a camera measures any possible twisting or incorrect position and forwards it to the software. The software compensates for the inaccuracies and forwards the corrected data to the processing system.

Within the processing face 122, a heating element 126 is indicated which is designed to apply heat locally to the document to be processed. This can be beneficial for individual processing steps, for example for drying ink or the like. Therefore, the heating element 126 is preferably provided in the areas where ink is applied during processing. This is usually the case for security-critical documents when displaying a passport photo. Thus, the heating element 126 is preferably located at the place of a passport photo of a document.

FIGS. 2a and 3a show an embodiment of a prior art document processing system 10 in two different configurations. A first mirror arrangement 21 which directs laser beams 81 from a radiation source (not shown) onto a document 51 to be processed is arranged in a processing area 82. The illustration of the attachment of the mirror arrangement 21 is omitted for the sake of clarity.

In this case, the mirror arrangement 21 is arranged in the first configuration of FIG. 2a in such a manner that the laser beams 82 generate a first visible element 551a on a specific position of the surface of the document 51. The corresponding document 51 is shown here in FIG. 2b in a top view (view from above), where the first visible element 551a is indicated at the defined position. Here, the horizontal axis of the document 51 runs in drawing plane from top to bottom, while the vertical axis runs in drawing plane from left to right.

In contrast, the arrangement of the first mirror arrangement 21 in FIG. 3a is modified according to the second configuration in such a manner that now the laser beams 82 are directed to a different position on the surface of the document 51 than in the arrangement shown in FIG. 2a, as a result of which a second visible element 551b becomes visible on the document 51, as FIG. 3b shows.

In this regard, changing the arrangement of the mirror arrangement 21 involves some effort in prior art document processing systems 10. For example, the document 51 must first be removed before the arrangement of the mirror arrangement 21 can be changed. Often, an additional calibration or test run must be carried out to verify the new arrangement, often making the processing and creation of two different visible elements 551a, 551b at two different positions a lengthy process.

Figure 4A:
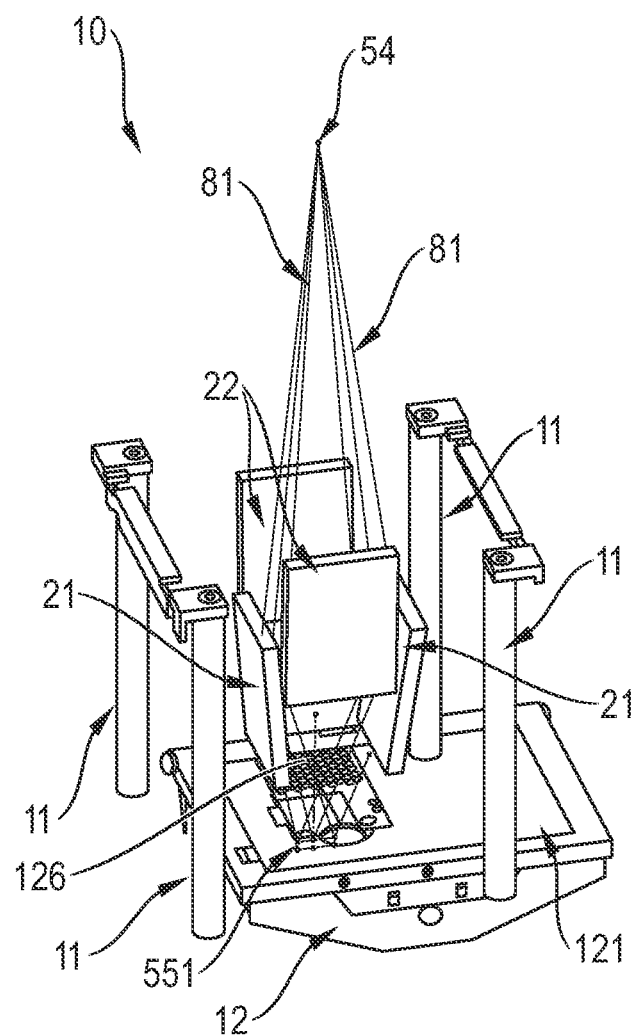
FIG. 4a shows a schematic illustration of an embodiment of a document processing system 10 according to the invention in a first configuration.

FIG. 4a shows a document processing system 10 according to the invention in a first configuration. The document processing system 10 has a document carrier device 12, which in turn has a document receptacle 121 corresponding to the schematic illustration of FIG. 1. In the document receptacle 121 in which the document 51 to be processed is placed, a heating device 126 is provided, which is indicated in FIG. 4a by holes in the surface of the document receptacle 121. In this embodiment, the heating device 126 is provided by a heating element which can be moved in parts out of the holes by an actuator to dissipate heat to a document 51 placed thereon. If no heat supply is required, the heating element is lowered again so that a heat supply is largely prevented.

The document processing system 10 further has a document processing device 11 which comprises a first mirror arrangement 21, a second mirror arrangement 22, and a radiation source 54, in the form of a laser. Laser beams 81 emitted by the laser are directed onto the surface of the document 51 (not shown) lying on the document receptacle 121 to produce a visible element 551 in the form of a tilt image. To produce a tilt image, the laser beams 81 must impinge on the surface of the document 51 at a specific angle. The two mirror arrangements 21, 22 are used for this purpose.

Here, the mirror arrangements 21, 22 are arranged rotated at an angle of 90 degrees to each other. Thus, the laser beams guided by them also impinge on the surface at an angle of 90 degrees offset from each other. While the first mirror arrangement 21 produces a tilt image which becomes visible when the document 51 is tilted about the horizontal axis (MLI element, see FIG. 4a), a tilt image which becomes visible when the document 51 is tilted about the vertical axis can be introduced into the document 51 by the second mirror arrangement 22 (CLI element, see FIG. 4b).

Thus, by the described arrangement it is possible to insert both MLI elements and CLI elements in one arrangement into the document without converting the system.

FIG. 4a shows the document carrier device 12 in a first processing position. This corresponds to the first configuration of the document processing system 10. The processing position is the position of the document carrier device 12 where processing is to take place, thus, where the visible element 551 is to be applied onto the document 51.

Figure 4B:
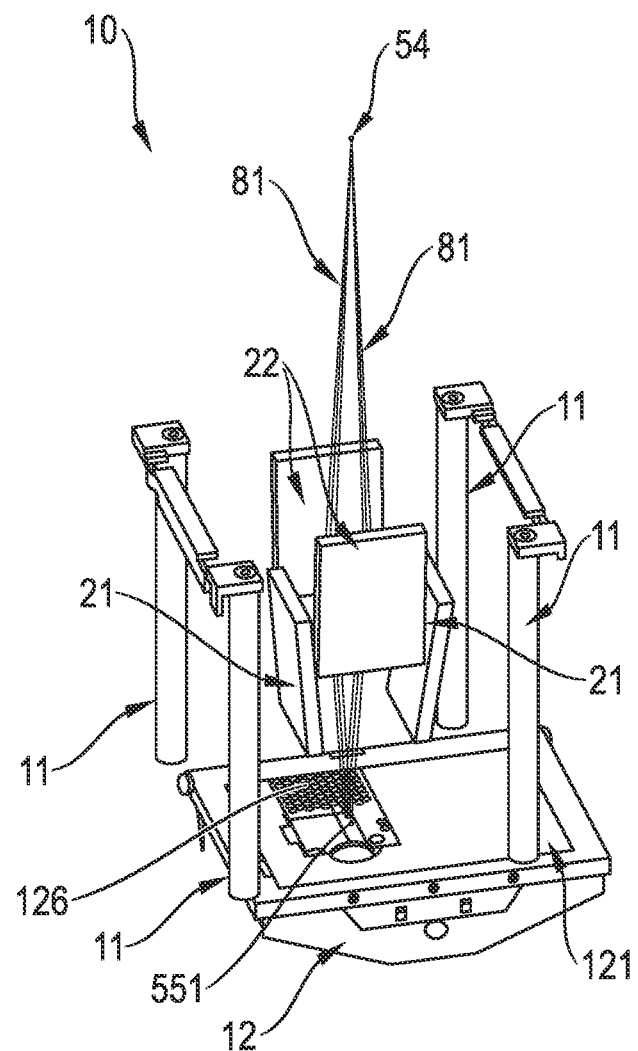
FIG. 4b shows a schematic illustration of an embodiment of a document processing system 10 according to the invention in a second configuration.

FIG. 4b shows the same arrangement as FIG. 4a, in which only the position of the visible element 551 in the form of the tilt image to be produced has changed, and the laser beams 82 guided by the second mirror arrangement are shown. This becomes also apparent from the fact that the visible element 551 is rotated by 90 degrees compared to FIG. 4a. In order to change the position of the visible element 551 to be produced on the document 51, it is possible according to the invention that the document carrier device 12 can be moved in two spatial directions under the document processing device 11 so as to change the processing position. Thus, the change in position of the visible element 551 to be applied results from the change in position of the document carrier device 12 together with the document 51 arranged thereon in relation to the document processing device. Comparing both FIGS. 4a and 4b, it is clear that the processing position has changed and thus the position of the visible element 551 to be applied on the document 51 has also changed. Due to the change in the position of the document carrier device 12, the document processing system in FIG. 4b is in the second configuration.

The movement of the document carrier device 12 is implemented here by a cross table. This cross table comprises the document carrier device 12 which is arranged on a first rail and can be moved thereon in a spatial direction. The first rail in turn is arranged on a slide which itself can be moved on a second rail along a second spatial direction. Thus, the document carrier device 12 can be moved by means of the two rails in a plane which is spanned by the two spatial directions. In this case, the movement is preferably implemented by corresponding actuators such as linear motors or the like.

Figure 5A:
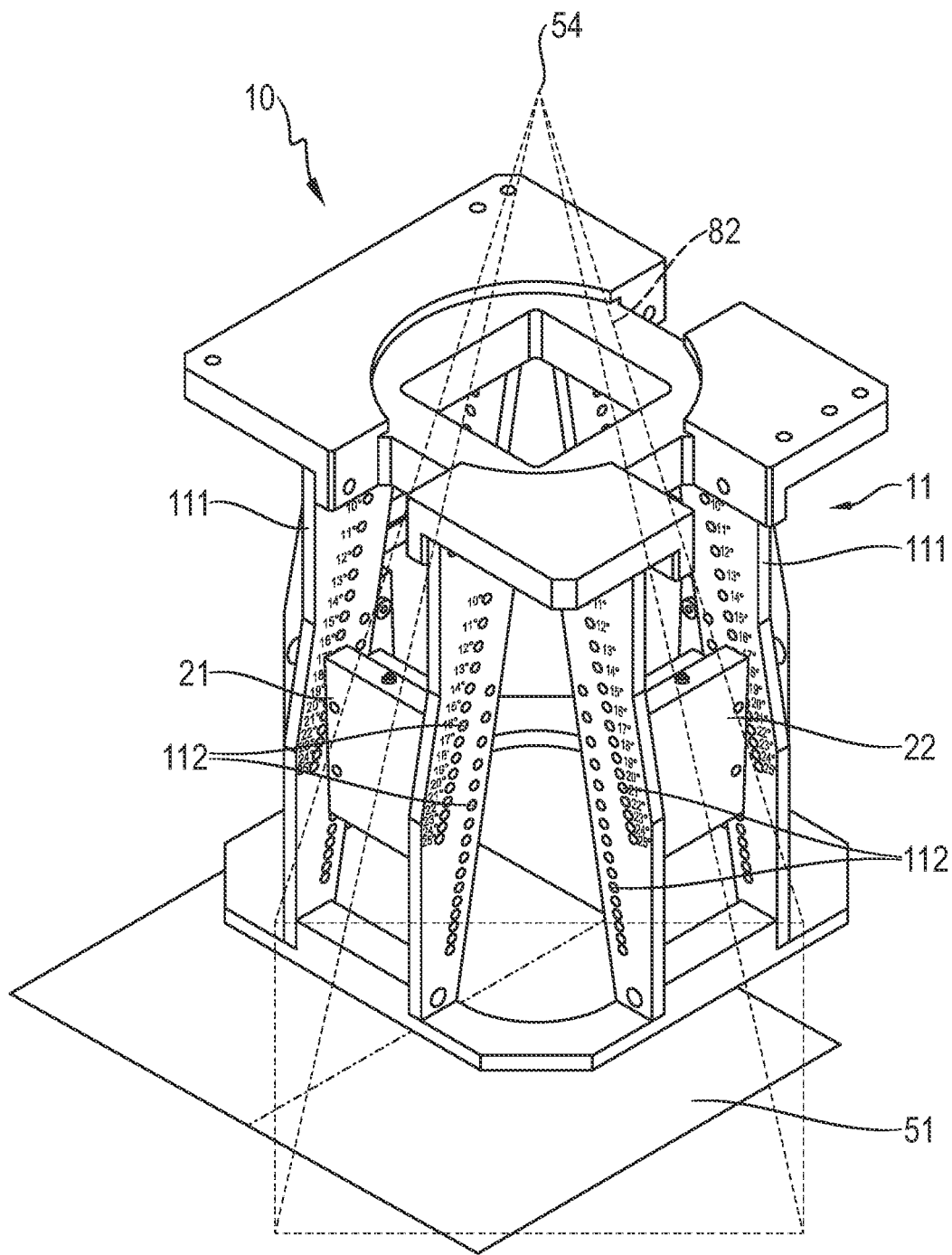
FIG. 5a shows a second embodiment of a document processing system 10 according to the invention in a perspective view.

FIG. 5a shows a second embodiment of a document processing system 10 according to the invention in a perspective view. Here, it comprises a document processing device 11 and a document carrier device which, however, is not illustrated in the figure shown. A document 51 is shown on the document carrier device. As in the previously described embodiment, the document carrier device is designed as a cross table which can move the document 51 in the plane so as to change the position of the document 51 relative to the document processing device 11.

Furthermore, a radiation source 54 is provided which is capable of emitting laser beams within a processing area 82. The processing area 82 has a rectangular cross-sectional shape, in particular a square cross-sectional shape in the embodiment shown, and is indicated by the dashed lines.

Figure 5B:
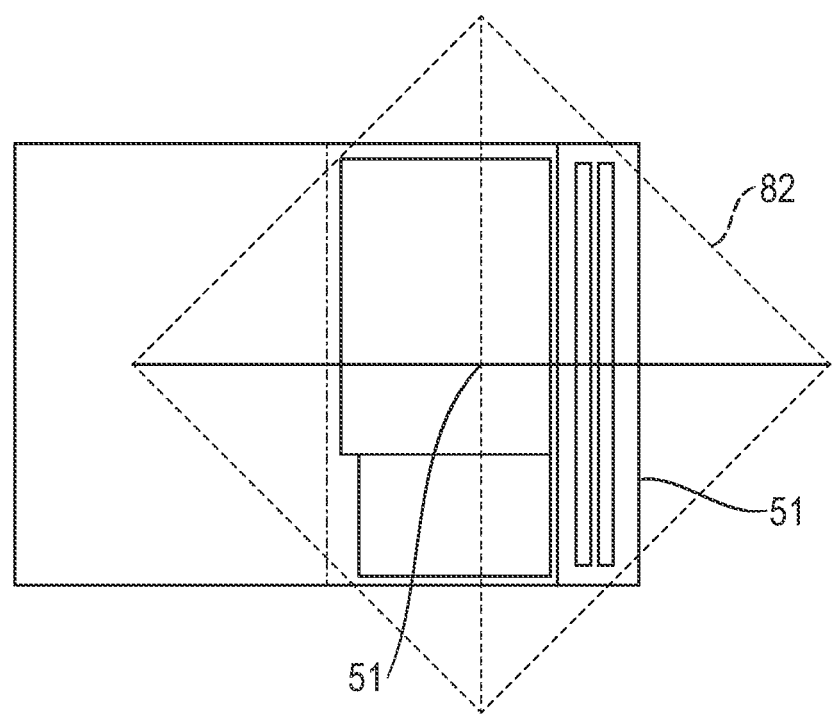
Figure 5C:
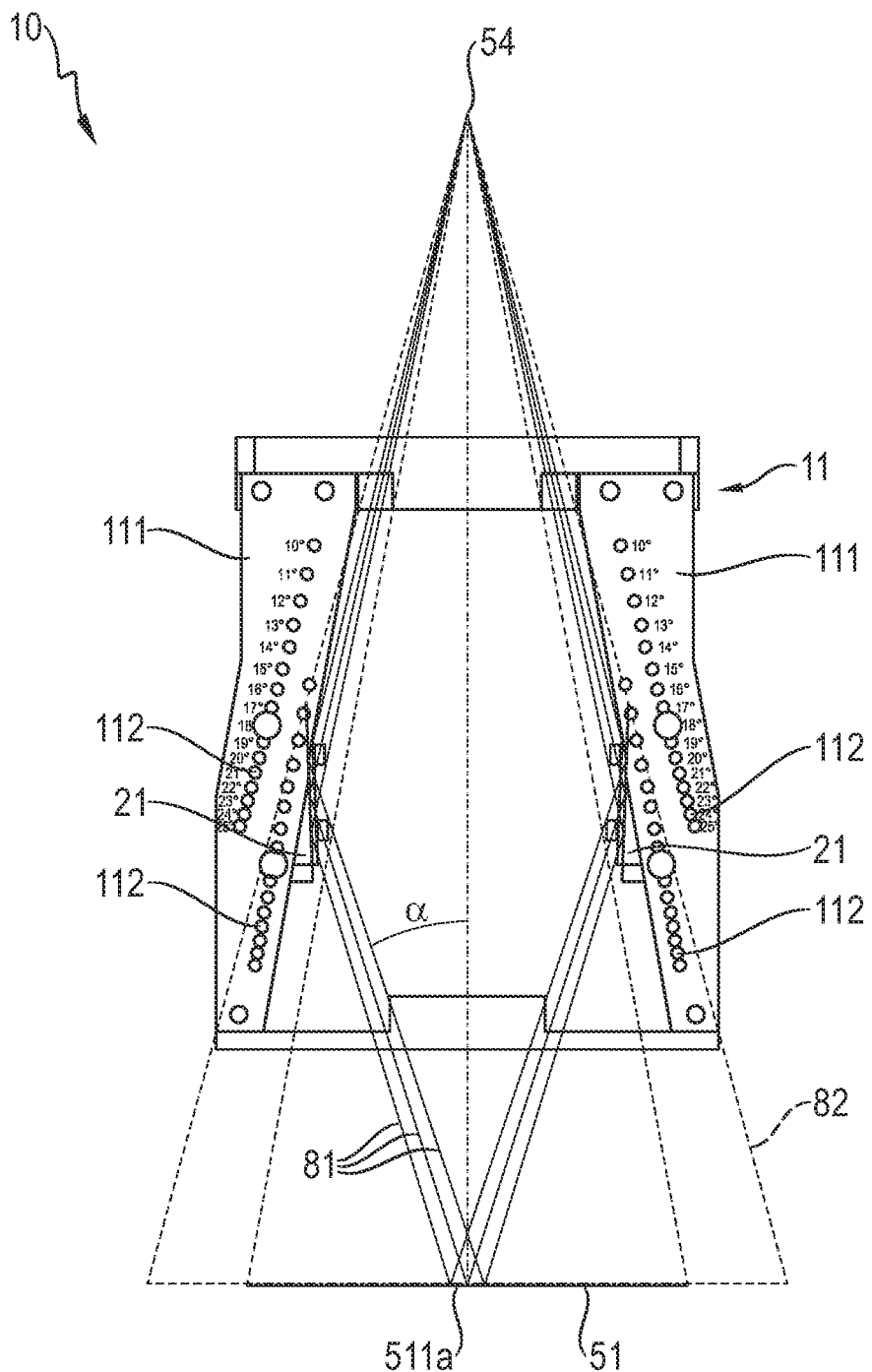
FIG. 5c shows a side view of the second embodiment of the invention shown in FIG. 5a in a first configuration.
Figure 5D:
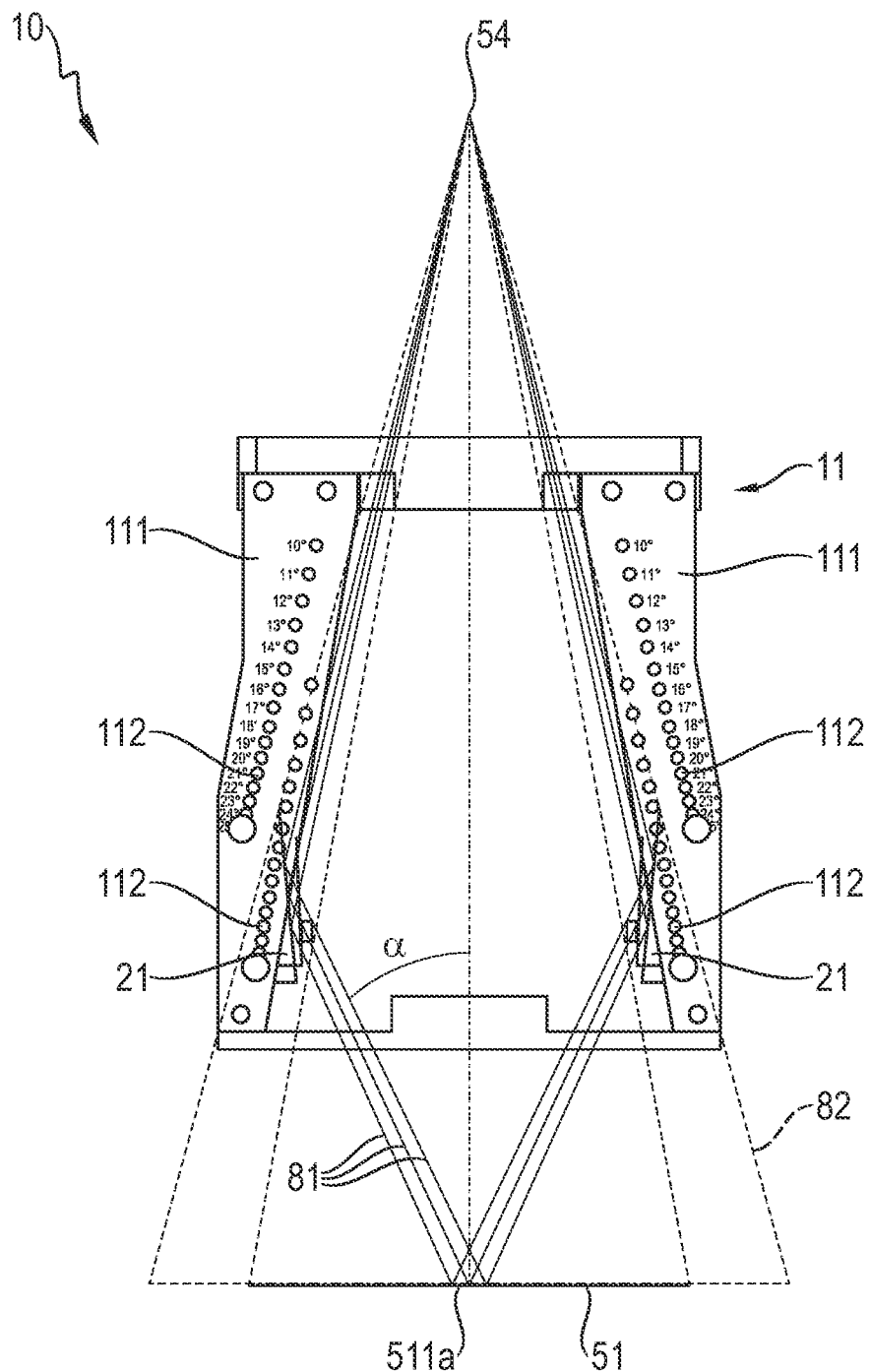
FIG. 5d shows a side view of the second embodiment of the invention shown in FIG. 5a in a second configuration

The radiation emitted in the processing area 82 can further be directed to the document 51 by two mirror arrangements 21, 22 (see also FIGS. 5c and 5d). The mirror arrangements 21, 22 each consist of two mirrors facing each other and are arranged between carrier elements 111 of the document processing device 11. The mirror arrangements 21, 22 are each arranged parallel to the longitudinal or transverse direction of the square, in particular parallelogram-shaped document 51. The carrier elements 111 each have openings into which corresponding counter elements arranged on the mirrors engage. The mirrors can be removed from the openings and inserted into other openings provided for this purpose in order to change the position of the corresponding mirror and, at the same time, the orientation thereof. The openings are thus to be understood as an adjustment device 112.

First, the processing area will be discussed in more detail below with reference to FIGS. 5a and 5b. FIG. 5b shows the processing area 82 of the second embodiment shown in FIG. 5a in a plan view. The processing area 82 is rotated by 45 degrees relative to the document 51. This makes it possible to position the mirror arrangements 21, 22 further out so that they are still located in the processing area 82 but do not block the direct path between the radiation source 54 and the document 51, so as to create the possibility of performing personalizations on the document 51 using the radiation source (without using the mirror arrangements 21, 22) without converting the mirror arrangements 21, 22. Accordingly, by rotating the processing area 82, the processing area can be fully utilized. Alternatively, a radiation source 54 with a larger processing area 82 could also be used, which, however, would result in greater hazards from the radiation that can be generated (in particular laser radiation), which would have to be contained in a correspondingly complex manner.

FIGS. 5c and 5d show a side view of the second embodiment of the invention shown in FIG. 5a in a first configuration and a second configuration, respectively. The configurations differ in that the illustrated first mirror arrangement 21 is positioned differently. It should be noted at this point that the figure could also represent a side view with the second mirror arrangement 22.

A radiation 81 emitted by the radiation source 54 in the processing area 82 is directed through the first mirror arrangement onto the document 51. The mirrors of the first mirror arrangement 21 are arranged symmetrically, that is, they are located at the same height (position) above the document 51 and reflect the radiation 81 at the same angle onto the surface of the document 51. This angle is referred to as the first defined angle α and determines at which angle α first visible element 551a imprinted in this manner can be seen. The choice of the angle depends in particular on the choice of the material of the document 51 as well as the specific customer requirements.

Comparing the two configurations shown in FIGS. 5c and 5d, it is noticeable that the first mirror arrangement 21 in the first configuration shown in FIG. 5c is arranged higher than in the second configuration shown in FIG. 5d, and thus the angle α at which the radiation is directed onto the document 51 is different. The height adjustment is carried out by the adjustment device 112. A configuration is thus defined by a defined position of the first mirror arrangement 21. The alignment of the mirrors is also determined by the corresponding definition of the openings, that the angle α in which the radiation impinges on the document 51 is reproducibly linked to a position of the mirrors. Preferably, for ease of understanding, the openings are labeled to facilitate operation and adjustment of the configurations. The change of the angle α at which the radiation impinges on the document 51 can thus be adjusted by the different configurations, with the mirrors of a mirror arrangement always being adjusted symmetrically. The adjustment device can be implemented in an automated manner or rely on manual execution of the change of configuration.

In contrast to the embodiment shown in FIGS. 2a and 2b, the position of the visible element 551a, 551b to be created is carried out by changing the position of the document 51 using the document carrier device 12. Thus, the visible element 551a, 551b to be created is always produced at the same position in relation to the document processing device 11. The position of the visible element 551a, 551b to be created on the document 51 is set by the document carrier device 12. In doing so, the visible element 551a, 551b to be produced is produced centrally below the document processing system 10. In this manner, it can be achieved that no adjustment of the software is necessary when the mirror alignment and position are changed. As a result, a simple changeover of the document processing system 10 to different documents 51 with different requirements and materials can be implemented.

Figure 5E:
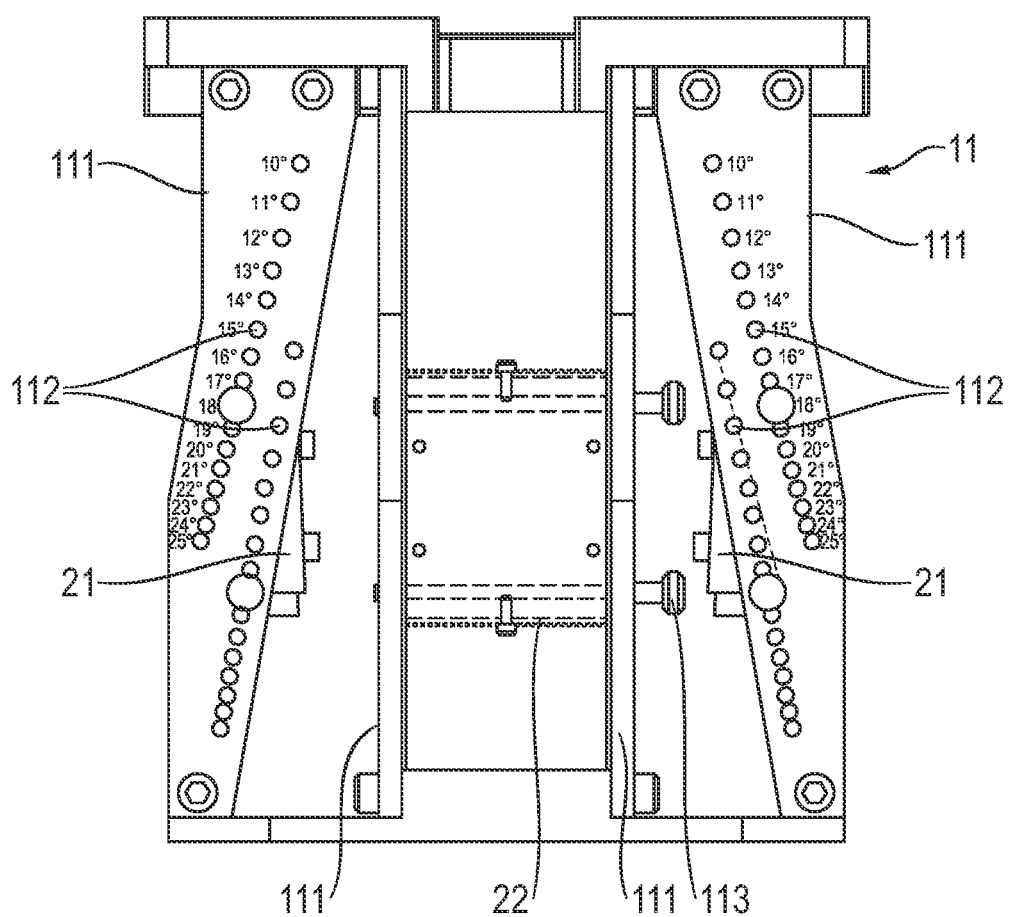

With reference to FIG. 5e, the adjusting device 112 of the mirror arrangements is described in more detail below. FIG. 5e shows the arrangement illustrated in FIGS. 5c and 5d, with the second mirror arrangement 22 also being shown in addition to the first mirror arrangement 21 and with each mirror of the mirror arrangement 22 being fastened to two carrier elements 111. The fastening is carried out by means of the adjusting device 112. For this purpose, counter elements 113 in the form of pins are inserted into openings, in particular fitting holes provided for this purpose on the carrier elements 111, in the drawing plane of the figure from right to left. The correspondingly fastened mirror can thus be mounted with a high degree of accuracy. The counter elements 113 are fixed by means of a clamping by spring pressure pins located in a contact plate arranged on the rear side of the mirror. These pins fix the counter elements in the assembled state. Here, the counter elements 113 extend from one side through the first carrier element 111 through the contact plate of the mirror to the second carrier element 111. Furthermore, embodiments of the invention are possible in which corresponding counter elements 113 are inserted from both sides. In both embodiments, the counter elements 113 can be provided with a thread to enable a screw connection in one of the carrier elements, or they can be configured as smooth pins.

By means of the described embodiment of the adjusting device 112, the corresponding mirror can thus be positioned at the correct height and also with the correct angle since the orientation can also be influenced by the predetermined openings.

REFERENCE LIST 10 document processing system
11 document processing device
111 carrier element
112 adjusting device
113 counter element
12 document carrier device
121 document receptacle
122 processing face
123 recess
124 card position
126 heating device
21 first mirror arrangement
22 second mirror arrangement
51 document
54 radiation source
551 visible element
551a first visible element
551b second visible element
81 laser beams
82 processing area
α first defined angle

The invention claimed is:

1. A document processing system for processing security documents, comprising,
   at least one document carrier device with a document receptacle, configured to receive and transport a document to be processed, and
   a document processing device configured to process the document in a specific processing area, wherein:
     the document carrier device is configured to move the document in two spatial directions within the document processing system,
     the document processing device includes at least one radiation source and is configured to apply tilt images onto the document, and
     the radiation source emits laser beam radiation in a quadrangular processing area and the document has a quadrangular shape, and wherein the processing area is rotated relative to the document by an angle of 45 degrees.

2. The document processing system according to claim 1, wherein the document processing device includes at least one first mirror arrangement which is configured to direct the radiation emitted by the radiation source onto the document at one or more of a first defined angle and from a first defined direction.

3. The document processing system according to claim 2, wherein the document processing device has a second mirror arrangement which is configured to direct the radiation emitted by the radiation source onto the document at one or more of a second defined angle and from a second defined direction, wherein the second defined direction of the second mirror arrangement is offset by 90 degrees with respect to the first defined direction of the first mirror arrangement.

4. The document processing system according to claim 3, wherein one or more of the first mirror arrangement and the second mirror arrangement are configured such that they can be modified during operation of the document processing device in such a manner that a position at which the radiation impinges on the document can be changed.

5. The document processing system according to claim 4, wherein the document processing system includes an adjustment device configured to change the position and alignment of one or more of the at least one first mirror arrangement and the at least one second mirror arrangement such that the first defined angle at which the radiation emitted by the radiation source is directed onto the document is changed without changing the position of impingement of the radiation on the document.

6. The document processing system according to claim 5, wherein the adjusting device includes receptacles, in the form of openings, which are configured to receive corresponding counter elements arranged on the at least one first mirror arrangement and the at least one second mirror arrangement, respectively, for fastening the mirror arrangements.

7. The document processing system according to claim 1, wherein the document carrier device is arranged on a cross table which is configured to move the document carrier device in two spatial directions which are perpendicular to one another, wherein linear motors are provided for moving the cross tables.

8. The document processing system according to any claim 1, wherein the document carrier device includes a heating device which is configured to dissipate heat to the document received by the document carrier device.

9. The document processing system according to claim 8, wherein the heating device includes an actuator configured to effect a relative movement between a heat conducting element and the document receptacle in order to change between a first operating mode and a second operating mode of the document carrier device, wherein in the first operating mode, the heat conducting member extends through one or more recesses in the document receptacle in order to be able to transfer heat generated by the heating device to the document at least in sections; and
   wherein in the second operating mode, the heat conducting element is spaced from the document at a distance that is greater compared to its location in the first operating mode.

10. A method for processing a document (51) in a document processing system according to claim 1, comprising the following steps:
   moving a document carrier device to a receiving position in which a document is placed on a document receptacle of the document carrier device
   moving the document carrier device along a first spatial direction and a second spatial direction to a first processing position within a processing area of the document processing system in which the document is processed, wherein the first spatial direction and the second spatial direction are not identical,
   moving the document carrier device to an output position in which the document is removed from the document receptacle.

* * * * *